United States Patent
Ghaffari et al.

(10) Patent No.: US 6,896,923 B2
(45) Date of Patent: May 24, 2005

(54) FROZEN CONFECTION

(75) Inventors: Ramin Ghaffari, Green Bay, WI (US); Jon Richard Oldroyd, Green Bay, WI (US)

(73) Assignee: Good Humor-Breyers Ice Cream, Green Bay, WI (US)

( * ) Notice: Subject to any disclaimer, the term of this patent is extended or adjusted under 35 U.S.C. 154(b) by 165 days.

(21) Appl. No.: 10/290,139

(22) Filed: Nov. 7, 2002

(65) Prior Publication Data

US 2004/0091597 A1 May 13, 2004

(51) Int. Cl.$^7$ ................................................. A23G 3/00
(52) U.S. Cl. ...................... 426/565; 426/572; 426/573; 426/578
(58) Field of Search ................................ 426/565, 572, 426/573, 578, 74, 586

(56) References Cited

U.S. PATENT DOCUMENTS

| | | |
|---|---|---|
| 3,800,036 A | 3/1974 | Gabby et al. |
| 4,626,441 A | 12/1986 | Wolkstein |
| 4,631,196 A | 12/1986 | Zeller |
| 4,900,566 A | 2/1990 | Howard |
| 4,959,227 A * | 9/1990 | Amer ........................... 426/35 |
| 5,084,295 A * | 1/1992 | Whelan et al. ............. 426/565 |
| 5,230,913 A | 7/1993 | Klemann |
| 5,238,696 A * | 8/1993 | Fuisz .......................... 426/565 |
| 5,246,725 A | 9/1993 | Fisher et al. |
| 5,292,544 A | 3/1994 | Coutant et al. |
| 5,456,936 A | 10/1995 | Toonen |
| 5,525,352 A | 6/1996 | Kontos et al. |
| 5,780,451 A | 7/1998 | DeMichele et al. |
| 5,885,936 A * | 3/1999 | Zhang ......................... 504/288 |
| 5,928,691 A | 7/1999 | Reddy et al. |
| 5,948,458 A | 9/1999 | Swartz et al. |
| 5,952,314 A | 9/1999 | DeMichele et al. |
| 5,958,476 A | 9/1999 | Cain et al. |
| 5,985,339 A | 11/1999 | Kamarei |
| 6,030,650 A | 2/2000 | Kamarei |
| 6,039,986 A * | 3/2000 | Mallangi et al. .............. 426/74 |
| 6,093,425 A | 7/2000 | Kamarei |
| 6,117,474 A * | 9/2000 | Kamada et al. ............. 426/590 |
| 6,468,568 B1 * | 10/2002 | Leusner et al. ................ 426/72 |
| 6,740,344 B2 * | 5/2004 | Murphy et al. ................ 426/34 |
| 2003/0026882 A1 | 2/2003 | Poorman |

FOREIGN PATENT DOCUMENTS

| | | |
|---|---|---|
| EP | 0 875 153 | 11/1998 |
| EP | 1 072 196 | 1/2001 |
| EP | 0 837 635 | 8/2001 |
| GB | 1 341 963 | 12/1973 |
| GB | 1 484 167 | 9/1977 |
| WO | 97/06697 | 2/1997 |
| WO | 97/34496 | 9/1997 |
| WO | 00/45650 | 8/2000 |
| WO | 00/61110 | 10/2000 |
| WO | 01/50873 | 7/2001 |

OTHER PUBLICATIONS

International Search Report on PCT/EP 03/12221 dated Jul. 23, 2004.
Internet article, Trends in Product Development, *From Showcased Ingredients to the Dairy Case*, by Donna Berry, accessed Oct. 31, 2002, pp. 1–10—mentioned on p. 4 of the specification.
Akzo Nobel, *Akucell® Cellulose Gum* Internet article accessed Oct. 31, 2002.
Internet article for Chocolate Recipes for Chocolate Pudding accessed Oct. 29, 2002.
Internet article for Chocolate Recipes for Chocolate Pudding and Plum Pudding accessed Oct. 29, 2002.
Internet article for Chocolate Recipes for Baked Chocolate Fudge Pudding accessed Oct. 29, 2002.
Internet article for Chocolate Recipes for Chocolate Pudding In A Cloud accessed Oct. 29, 2002, 2 pages.
Internet article for Chocolate Recipes for Chocolate Ice Box Pudding accessed Oct. 29, 2002.
Carb Smart, Internet article on Atkins Shake Mixes accessed Oct. 31, 2002; pp. 1–3.
FMC BioPolymer, Internet article on Products/MCC/cellulose gel, pp. 1–2.
Abstract of Tvorogova et al. Kholodil'naya Tekhnika 1996, No. 3, 20–21, Stabilizers for ice cream.
Abstract of Rothwell, J., Ice Cream and Frozen Confectionery, 1985, 36 (9) 442, 450–451.

* cited by examiner

*Primary Examiner*—N. Bhat
(74) *Attorney, Agent, or Firm*—Gerard J. McGowan, Jr.

(57) ABSTRACT

Frozen confections having a combination of ingredients which permit the formulator to continue to provide outstanding organoleptic properties while at the same time reducing the caloric impact for those consumers who desire to limit their caloric intake. In a first aspect, the invention relates to a frozen confection which comprises less than 5 wt. % triglyceride fat, polydextrose and tricalcium phosphate. In another aspect, the product includes both polydextrose and cream, optionally in combination with tricalcium phosphate and/or karaya gum to produce a low fat frozen confection with good organoleptic properties. In a further aspect, the invention comprises a frozen confection comprising: less than 5 wt. % triglyceride fat, polydextrose, and a karaya gum. The products of the invention combine good organoleptic properties with a substantially reduced fat level compared to regular fat and, especially premium and super-premium ice creams. Preferably, the confection employs a level of triglyceride fat which is less than 1 wt. %, more preferably less than 0.5 wt. %.

13 Claims, No Drawings

FROZEN CONFECTION

BACKGROUND OF THE INVENTION

Increasingly, a focus of modern preventive medicine is weight reduction. Excessive weight is frequently cited in reports concerning the surge in cases of type 2 diabetes. Moreover, obesity is often cited in discussions of other modern diseases, such as heart disease.

In spite of the relentless attention in the health community to the problems caused by excess weight, weight control remains an elusive goal for many. Exercise continues to have limited appeal for a substantial proportion of the population. So, for many, diet remains the main weapon in the battle to cast off pounds.

Another recent focus of preventive medicine has been saturated and trans fats. Suggestions have been made by some health professionals and academics to lower the intake of these substances.

Frozen confections, such as ice cream, water ice, sherbet and the like, have long been popular among children and adults alike. Formulators of frozen confections and related products, as well as academics and others, have attempted to provide products having fewer calories, lower levels of fat, and various other features desired by consumers for one reason or another.

Kamarei U.S. Pat. No. 6,093,425 (Princeton Nutrition) is directed to complete nutritional milk compositions such as ice creams which are prepared through pasteurization, ultra-pasteurization or sterilization processes. From about 0.1% to about 250% of the daily value of Vitamin C and from about 0.1% to about 80% of the daily values of calcium, iron, vitamin D, vitamin E, vitamin K, thiamine, riboflavin, niacin, vitamin B6, Folate, vitamin B12, biotin, pantothenic acid, iodine, magnesium, zinc, selenium, copper, phosphorus, manganese, chromium, molybdenum and chloride based on a 2000 calorie diet may be used. Fat free milk, low fat milk, full fat milk, lactose-free milk, concentrated milk and dry milk are mentioned among possible milk sources. Ice creams with 10% fat, 15% fat and 17% fat are mentioned. Sundaes and milk shakes are also said to be contemplated. Numerous protein sources such as whey protein and gelatin are given. Carbohydrate sources listed include sucrose, corn syrup solids, glucose, fructose and maltodextrin. Fiber sources such as guar gum, pectin and gum arabic are mentioned. From 10 to 25% of the daily value of essential vitamins and essential minerals are said to be used in the compositions of Table 5. Components such as fillers, flavors and emulsifiers may be included. Example 3A, Table 18 discloses a "complete nutritional light vanilla ice cream," including full fat milk and Half & Half brand beverage lightener. Example 3B/Table 19 discloses a fat free, lactose free "complete nutritional chocolate fudgesicle ice cream" including 100% fat-free, lactose free milk. Vanilla extract is used in examples 18 and 19; example 19 employs chocolate pudding. Kamarei U.S. Pat. No. 6,030,650 is similar. Kamarei U.S. Pat. No. 5,985,339 is also related.

GB 1,484,167 (Kraftco) (published 1977) is directed to a milk shake including a freezing point depressant. Stabilizing agents include sodium CMC, sodium alginate, propylene glycol alginates, locust bean gums and guar gums, preferably in mixtures. Emulsifiers can be included. A gas is injected to generate from 50 to 100% overrun. In Example I, carrageenan, malt powder, and a vitamin mineral mix are included.

According to the English language abstract, of Tvorogova et al. Kholodil'naya Tekhnika 1996, No. 3, 20–21, use of stabilizers in ice cream is discussed with respect to foaming, emulsifying and gelling properties. Products included starch, gelatin, methyl cellulose, carboxymethyl cellulose, wheat flour, pectin, carrageenan, Cremodan and skim milk.

According to the English language abstract, Rothwell, Ice Cream and Frozen Confectionery, 1985, 36 (9) 442, 450–451 discusses the historical development of diabetic and dietetic ice creams. Use of polydextrose as bulking agent is discussed. One of the basic mixes includes 4% fat (either milk or non-milk fat), 15% polydextrose, 0.5% microcrystalline cellulose, 0.2% sodium citrate, 11.3% milk SNF, 0.75% stabilizer/emulsifier, and 0.75% aspartame.

Gabby et al. U.S. Pat. No. 3,800,036 (Drackett), is directed to frozen desserts including ice milk and imitation ice cream having optionally up to 7 wt. % fat. Polyglycerol fatty acid ester is employed as texturizing agent. Low fat or concentrated skim milk may be used. A hydrophilic colloid or gum may be used as stabilizer. Examples include locust bean gum, gelatin, carrageenan, water dispersible polysaccharides such as carboxymethyl cellulose and pectin, and starch (preferably pregelatinized). Sugar may be included and an inert bodying material such as dextran, inulin or microcrystalline cellulose may be substituted for sugar when artificial sweeteners are used. Other possible ingredients are fructose, dried egg white and starch. Milk solids may be replaced by another protein ingredient such as sodium caseinate, potassium caseinate and calcium caseinate. Liquid mixes may be frozen with aeration. Various frozen confection formulations are provided. Examples 3 (frozen dessert, shake type), 4 (fat free imitation vanilla ice cream), 5 (vanilla soft serve imitation ice cream) and 10 (chocolate imitation hard type ice cream) include ascorbic acid, niacinamide, calcium pantothenate, thiamine hydrochloride, pyridoxine hydrochloride, and riboflavin. Example 10 further includes Vitamin A & D powder. Polysorbate 80 is used in several formulations. Cain et al. U.S. Pat. No. 5,958,476, which is from the same patent family as EP 837 635 (Loders Croklaan), is directed to a frozen or chilled confectionery product provided with an amount of fat continuous, bicontinuous or duplex fat emulsion having a specified hardness. A thickener can be selected from a group including gelatin, casein, caseinates, corn starch, pectin, carrageenan gum, polydextrose, maltodextrins, hydrolyzed starch, modified starch, and xanthan gum.

Silhouette® Low Fat Ice Cream Sandwich (vanilla/mint flavors), said to be 98% fat free, lists the following ingredients: nonfat milk, sugar, corn syrup, cellulose gel, locust bean gum, mono and diglycerides, guar gum, cellulose gum, polysorbate 80, carrageenan, natural vanilla flavoring and cocoa (apparently for a chocolate variant). The ingredients listed for the wafers are: bleached wheat flour, soybean oil, caramel color, corn sugar, cocoa, high fructose corn syrup, modified corn starch, salt, baking soda and soy lecithin. Strawberry, coffee and mint flavors are said to contain all natural extract (Mint extract contains FD&C yellow #5, FD&C Blue #1, sodium benzoate, potassium sorbate and citric acid. The % daily value indicated on its label for vitamin A was 0%, calcium was 8%, vitamin C was 0% and iron was 0%.

At least as of Oct. 31, 2002, Atkins chocolate shake mixes are disclosed on the Carbsmart website to include tricalcium phosphate, polydextrose, whey protein isolate, and various vitamins.

Berry, "From Showcased Ingredients to the Dairy Case," Dairy Foods 9/2002, mentions tricalcium phosphate among tasteless calcium salts. The article also mentions Luke's Ice Cream of Riviera Beach, Fla. as manufacturing Sugar Free Fat Free Frozen Treat made using delactosed non fat milk, polydextrose, maltodextrin, and sucralose. It also indicates that for many "better for you frozen desserts," bulking agents such as polydextrose and maltodextrin are necessary. It has a neutral taste, is highly soluble and has fiber properties.

Coutant et al. U.S. Pat. No. 5,292,544 (reassigned to Rhodia) is directed to low fat, very low fat or fat free emulsion simulating food products prepared by adding tricalcium phosphate to develop an opaqueness and smoothness in the food, and to reduce gloppiness in foods containing gum, especially xanthan. Use in ice cream and ice milk products is mentioned. Locust bean gums, starches, starch maltodextrin and cellulose gels are mentioned. Example 8 is directed to a fat free shake including tricalcium phosphate, corn syrup solids and xanthan gum.

Toonen U.S. Pat. No. 5,456,936 is directed to a substantially lactose-and sugar-free, low calorie frozen confection having a 20% to 100% overrun. Gums which can be used are said to include locust bean gum, carrageenan, xanthan gum, guar and carboxymethyl cellulose. Cellulose gel can be used as a stabilizer. Among the bulking agents mentioned are polydextrose, maltodextrose, sugar alcohol or starches.

Despite the appearance of a plethora of "healthy" variants of numerous types of products, it seems clear that many consumers are not willing to sacrifice the organoleptic properties of their favorite indulgence because of some imaginable health benefit in the future. This is especially true of comfort foods such as frozen confections. Thus, a developer of frozen confections faces the formidable challenge of providing products which continue to have outstanding organoleptic properties while at the same time reducing the caloric impact for those consumers who would benefit from assistance in losing weight.

SUMMARY OF THE INVENTION

The present invention is directed to the discovery of combinations of ingredients for frozen confections which permit the formulator to continue to provide outstanding organoleptic properties while at the same time reducing the caloric impact for those consumers who desire to limit their caloric intake.

In a first aspect, the invention relates to a frozen confection which comprises (a) less than 5 wt. % triglyceride fat, (b) polydextrose and (c) tricalcium phosphate. Preferably, the confection employs a level of triglyceride fat which is less than 1 wt. %, more preferably less than 0.5 wt. %. In a further preferred embodiment, at least one source of fat is cream.

In a further aspect of the invention, the product includes both polydextrose and cream, optionally in combination with tricalcium phosphate and/or karaya gum to produce a low fat frozen confection with good organoleptic properties.

In a still further aspect, the invention comprises a frozen confection comprising: (a) less than 5 wt. % triglyceride fat, (b) polydextrose, and (c) a karaya gum. Preferably, the level of triglyceride fat is less than 1 wt. %, especially less than 0.5 wt. %. Again it is preferred that at least one source of fat is cream.

The products of the invention combine good organoleptic properties with a substantially reduced fat level compared to regular fat-and, especially premium-and super premium-ice creams.

In an especially preferred embodiment, in addition to the tricalcium phosphate, the frozen confection is fortified with one or more vitamins and/or minerals and/or fibers, thus further improving the health profile of the product.

For a more complete of the above and other features and advantages of the invention, reference should be made to the following description of the preferred embodiment.

DETAILED DESCRIPTION OF THE INVENTION

The product of the invention is a frozen product, such as ice cream, sherbet, water ice and the like. It is not a non-frozen or partially frozen product such as a milk shake or other beverage. "Frozen", as used herein, denotes that the product is solidified under freezing conditions to a hardpack or spoonable consistency which is not fluid or semi-fluid. The frozen confection may be combined with other ingredients such as wafers in an ice cream sandwich or an appropriate sauce in a sundae. It is preferably a water-continuous emulsion.

Generally the product of the invention will include a dairy source, such as whole milk, skim milk, condensed milk, evaporated milk, cream, butter, butterfat, whey, milk solids non-fat, etc. The dairy source will generally contribute dairy fat and/or non-fat milk solids such as lactose and milk proteins, eg. whey proteins and caseins. In accordance with one aspect of the invention, cream is preferred notwithstanding the overall low fat levels present in the composition. With the use of cream in combination with polydextrose and, optionally tricalcium phosphate, a low fat product is obtained with good flavor. While butter fat from cream and other dairy sources is preferred, alternative fat sources, such as vegetable fat, may be used. For example, fats may be taken from the group which includes cocoa butter, illipe, shea, palm, palm kernal, sal, soybean, cottonseed, coconut, rapeseed, canola, and sunflower oils.

The level of triglyceride fat in the product, indeed preferably the total level of digestible lipid in the product, is preferably 5 wt. % or less, more preferably, 1.5 wt. % or less, especially 1.0 or even 0.5 wt. % or less. Lower limits for the triglyceride fat or other lipids can be zero, 0.25 wt. % 1 wt. % or higher.

The product will typically include an emulsifying agent. Typical emulsifying agents may be phospholipids and proteins or esters of long chain fatty acids and a polyhydric alcohol. Fatty acid esters of glycerol, polyglycerol esters of fatty acids, sorbitan esters of fatty acids and polyoxyethylene and polyoxypropylene esters of fatty acids may be used but organoleptic properties, or course, must be considered. Mono-and di-glycerides are preferred. Emulsifiers are used in amounts of about 0.03% to 0.3%, preferably 0.05% to 0.1%.

Soybean protein isolates combined with modified food starches such as Ultrafreeze 400C® obtained from A.E. Staley Manufacturing Co. may assist in texturizing the product and, if present, are used in amounts of 0.5% to 3.0%, preferably 0.75% to 2.0%.

Gum stabilizers are particularly effective in controlling viscosity, providing mouth feel and improving whipping (aerating) properties; to provide a protective colloid to stabilize proteins to heat processing; to modify the surface chemistry of fat surfaces to minimize creaming; to provide acid stability to protein systems and; to increase freeze-thaw stability. Gums can be classified as neutral and acidic, straight-and branched-chain, gelling and non-gelling. The principal gums that may be used are Karaya gums, locust bean gum, carageenan, xanthan, guar and carboxymethyl cellulose. Gums are generally used in concentrations of 0.02–0.5 wt. % of the composition or 1–6 wt. % of the protein level. Because of differing functionalities, combinations of certain gums may provide a better product than a single gum. In accordance with one aspect of the invention it is particularly preferred that karaya gum be used together with polydextrose, particularly for products of the type sold under the "Fudgesicle" name by Good Humor Breyers Ice Cream Company of Green Bay, Wis.

The stabilizer may be microcrystalline cellulose as described in U.S. Pat. No. 5,209,942, e.g., Avicel 581, which is activated or "peptized". Microcrystalline cellulose is cellulose crystallite aggregates with a level-off D.P. Level off DP is the average level-off degree of polymerization measured in accordance with the paper by O. A. Batista entitled: "Hydrolysis and Crystallisation of Cellulose," Vol. 42, pages 502 to 507, *Industrial and Engineering Chemistry*, 1950. An example of microcrystalline cellulose is the water-dispersible cellulose crystallite aggregates described for use in food compositions in British Patent No. 961 398 (Also cf. U.S. Pat. Nos. 2,978,446, 3,157,518 and 3,539,365). A combination of microcrystalline cellulose and sodium carboxymethyl cellulose (CMC) may give good results, and the microcrystalline cellulose, is preferably a material in which the particles are themselves coated with 10 percent (by weight of the material) of sodium carboxymethyl cellulose. The sodium carboxymethyl cellulose used for coating is preferably one of medium viscosity, that is one which, in 1 percent aqueous dispersion, has a viscosity of from 300 to 1000 centipoises at 20° C.

Microcrystalline cellulose has been listed in the *Fourth Supplement to the Food Chemicals Codes*, First Edition, by the National Academy of Sciences-National research Council as: Cellulose, Microcrystalline (cellulose gel). Cellulose gel in combination with cellulose gum is especially preferred.

Another component may comprise one or any combination of carboxymethylcellulose (in addition to that with which the microcrystalline cellulose may be coated), xanthan gum, starch and alginate.

Gelatin, e.g., 225 bloom, may be included in the compositions at levels of say 0.1–1 wt. %, especially from 0.2–0.6 wt. %.

Certain salts such as phosphates and chlorides may be employed to alter the buffering capacity of the system and to improve the water binding capacity of proteins and improve solubility and flavor. Sodium chloride and sodium monophosphate at very low levels are preferred but calcium phosphate and particularly monocalcium phosphate may also be employed. Sodium chloride is preferred at levels of 0.05% to 0.3%; and sodium monophosphate is preferred at levels of 0.01% to 0.1%. The bulking agents employed must have only trace amounts of mono- and disaccharides.

Generally the compositions of the invention will be naturally sweetened. Natural sources of sweetness include sucrose (liquid or solids), glucose, fructose, and corn syrup (liquid or solids). Other sweeteners include lactose, maltose, and galactose. Levels of sugars and sugar sources preferably result in sugar solids levels of up to 20 wt. %, preferably from 5 to 18 wt. %, especially from 10 to 17 wt. %.

If it is desired to use artificial sweeteners, any of the artificial sweeteners well known in the art may be used, such as aspartame, saccharine, Alitame® (obtainable from Pfizer), acesulfame K (obtainable from Hoechst), cyclamates, neotame, sucralose and the like. Aspartame is preferred. The sweeteners are used in varying amounts of about 0.005% to 1%, preferably 0.007% to 0.73% depending on the sweetener, for example. Aspartame may be used at a level of 0.05% to 0.15%, preferably at a level of 0.07% to 0.11%. Acesulfame K is preferred at a level of 0.09% to 0.15%.

In accordance with one aspect of the invention, the product includes polydextrose. Polydextrose functions both as a bulking agent and as a fiber source and is preferably included at from 1 to 10 wt. %, especially from 1 to 6 wt. %. Polydextrose may be obtained under the brand name Litesse® from Danisco Sweeteners. Among other fiber sources which may be included in the compositions of the invention are fructose oligosaccharides such as inulin.

In accordance with the preferred use of inert polydextrose, as a bulking agent, additional conventional bulking agents may be used such as maltodextrin, sugar alcohols, corn syrup solids, sugars or starches. Total bulking agent levels in the products of the invention will preferably be from about 5% to 20%, preferably 13% to 16%. Polydextrose may be obtained under the brand name Litesse.

If desired, glycerol may be used to control ice formation. Sorbitol may also be employed but glycerol is preferred. The glycerol may be used in an amount of about 1% to 5%, preferably 2.5% to 4.0%.

Flavorings are preferably added to the product but only in amounts that will impart a mild, pleasant flavor. The flavoring may be any of the commercial flavors employed in ice cream, such as varying types of cocoa, pure vanilla or artificial flavor, such as vanillin, ethyl vanillin, chocolate, extracts, spices and the like. It will further be appreciated that many flavor variations may be obtained by combinations of the basic flavors. The confection compositions are flavored to taste as mentioned above. Suitable flavorants may also include seasoning, such as salt, and imitation fruit or chocolate flavors either singly or in any suitable combination. Flavorings which mask off-tastes from vitamins and/or minerals and other ingredients are preferably included in the products of the invention.

Malt powder can be used, e.g., to impart flavor, preferably at levels of from 0.01 to 0.15 wt %, especially from 0.05 to 0.2%.

Preservatives such as Polysorbate 80, Polysorbate 65 and potassium sorbate may be used as desired.

Calcium is preferably present in the composition at from 10 to 30% RDI, especially about 25% RDI. The calcium source is preferably tricalcium phosphate. For example wt. % levels of tricalcium phosphate may range from 0.5 to 1.5%. In a preferred embodiment, the product is fortified with one or more vitamins and/or minerals and/or fiber sources, in addition to the tricalcium phosphate source of calcium. These may include any or all of the following:

Ascorbic acid (Vitamin C), Tocopheryl Acetate (Vitamin E), Biotin (Vitamin H), Vitamin A Palmitate, Niacinamide (Vitamin B3), Potassium Iodide, d-Calcium Pantothenate (Vitamin B5), Cyanocobalamin (Vitamin B12), Riboflavin (Vitamin B2), Thiamine Mononitrate (Vitamin B1), Molybdenum, Chromium, Selenium, Calcium Carbonate, Calcium Lactate, Manganese (as Manganese Sulfate), Iron (as Ferric Orthophosphate) and Zinc (as Zinc Oxide). The vitamins are preferably present at from 5 to 20% RDI, especially from about 15% RDI. Preferably, fiber sources are present in the product at greater than 0.5 wt. % and do not exceed 6 wt. %, especially 5 wt. %.

Some of the vitamins and/or minerals can be added to the frozen confection mix whereas others can be included in the ingredients for adjuncts such as wafers, variegates and sauces.

Processes used for the manufacture of the product are essentially the same as for their full dairy product counterparts. The processes common to all such products include: ingredient blending, pumping, pasteurization, homogenization, cooking, aeration, freezing and packaging. Products can be manufactured by batch or by continuous processes. Ingredients may be either liquid or dry, or a combination of both. Liquid ingredients can be blended by the use of positive metering pumps to a mixing tank or by in-line blending. Dry ingredients must be hydrated during the blending operations. This is most commonly accomplished by the use of turbine mixers in processing vats or by incorporating the dry material through a high speed, centrifugal pump. The blending temperature depends upon the nature of the ingredients, but it must be above the melting point of any fat and sufficient to fully hydrate gums used as stabilizers and: proteins. If batch processing is used, optional vitamins and other minerals may be blended with cold water, mixed well and added to the batch after a portion of the mix has flowed to the HTST units. Pasteurization is generally carried out in high temperature short time (HTST) units, in which the homogenizer is integrated into the pasteurization system. The protein and microcrystalline cellulose are advisedly fully hydrated before adding other components which might interfere with the hydration.

Unless stated otherwise or required by context, the terms "fat" and "oil" are used interchangeably herein. Unless otherwise stated or required by context, percentages are by weight.

EXAMPLE 1

A low fat fudge bar is prepared as above using the following ingredients:

| Ingredient | Percentage by Weight |
|---|---|
| Water | 64 |
| Sucrose Solids | 12 |
| Butterfat | 1.7 |
| Milk Solids Not Fat | 9 |
| Whey Solids | 3 |
| Corn Syrup Solids, 36 DE | 5 |
| Polydextrose, Litesse | 1.3 |
| Cocoa | 2 |
| Gelatin, 225 Bloom | 0.5 |
| Stabilizer | 0.3 |
| Malt Powder | 0.1 |
| Tricalcium Phosphate | 0.5 |
| Vitamin/Mineral Blend | |
| Water | 0.5 |
| Vitamin Blend | 0.07 |
| Total | 100. |

The vitamin blend includes: Ascorbic acid (Vitamin C), Tocopheryl Acetate (Vitamin E), Biotin (Vitamin H), Vitamin A Palmitate, Niacinamide (Vitamin B3), Potassium Iodide, d-Calcium Pantothenate (Vitamin B5), Cyanocobalamin (Vitamin B12), Riboflavin (Vitamin B2), Thiamine Mononitrate (Vitamin B1). Stabilizer is guar gum plus karaya gum.

Total solids in the mix are 36%.

Butterfat wt. % is 1.70.

EXAMPLE 2

A low fat chocolate ice cream is prepared according to the above procedures and having the following ingredients.

| Ingredient | Percentage by Weight |
|---|---|
| Water | 62 |
| Sucrose Solids | 11 |
| Butterfat | 0.4 |
| Milk Solids Not Fat | 10 |
| Whey Solids | 2.4 |
| Corn Syrup Solids, 36 DE | 4 |
| Polydextrose, Litesse | 5.25 |
| Cocoa | 2 |
| Gelatin, 225 Bloom | 0.25 |
| Stabilizer | 0.5 |
| Emulsifier | 0.2 |
| Tricalcium Phosphate | 1.1 |
| Vitamin/Mineral Blend | |
| Water | 0.5 |
| Vitamin Blend | 0.126 |
| Total | 100 |
| Total Mix Solids | 37.% |
| Butterfat | 0.40 |

The vitamin blend includes Ascorbic acid (Vitamin C), Tocopheryl Acetate (Vitamin E), Biotin (Vitamin H), Vitamin A Palmitate, Niacinamide (Vitamin B3), Potassium Iodide, d-Calcium Pantothenate (Vitamin B5), Cyanocobalamin (Vitamin B12), Riboflavin (Vitamin B2), Thiamine Mononitrate (Vitamin B1). Stabilizer is Microcrystalline Cellulose, Cellulose Gum, Mono & Diglycerides, Locust Bean Gum, Polysorbate 80, and Carrageenan. Emulsifier is mono and diglycerides and Polysorbate 80.

EXAMPLE 3

A low fat vanilla ice cream is prepared according to the methods above, with the following ingredients:

| Ingredient | Percentage by Weight |
|---|---|
| Water | 63. |
| Sucrose Solids | 11.5 |
| Butterfat | 00.4000 |
| Milk Solids Not Fat | 10.5 |
| Whey Solids | 2 |
| Corn Syrup Solids, 36 DE | 4 |
| Polydextrose, Litesse | 5.5 |
| Gelatin, 225 Bloom | 0.25 |
| Stabilizer | 0.5 |
| Emulsifier | 0.15 |
| Tricalcium Phosphate | 1.1 |
| Vitamin/Mineral Blend | |
| Water | 0.5 |
| Vitamin Blend | 0.13 |
| Total | 100 |
| Total Mix Solids | 36.% |
| Butterfat | 0.4% |

The vitamin blend includes: Ascorbic acid (Vitamin C), Tocopheryl Acetate (Vitamin E), Biotin (Vitamin H), Vitamin A Palmitate, Niacinamide (Vitamin B3), Potassium Iodide, d-Calcium Pantothenate (Vitamin B5), Cyanocobalamin (Vitamin B12), Riboflavin (Vitamin B2), Thiamine Mononitrate (Vitamin B1). Stabilizer is Microcrystalline Cellulose, Cellulose Gum, Mono & Diglycerides, Locust Bean Gum, Polysorbate 80, and Carrageenan. Emulsifier is mono and diglycerides and Polysorbate 80.

It should be understood of course that the specific forms of the invention herein illustrated and described are intended to be representative only, as certain changes may be made therein without departing from the clear teaching of the disclosure. Accordingly, reference should be made to the appended claims in determining the full scope.

What is claimed is:

1. A low fat frozen confection comprising:
   less than 5 wt. % triglyceride fat;
   polydextrose;
   and tricalcium phosphate, the fat of said frozen confection consisting essentially of triglyceride fat.

2. The frozen confection according to claim 1 wherein the level of triglyceride fat is less than 1 wt. %.

3. The frozen confection according to claim 2 wherein the level of triglyceride fat is less than 0.5 wt. %.

4. The frozen confection according to claim 1 wherein at least one source of fat is cream.

5. A low fat frozen confection comprising:
   less than 5 wt % triglyceride fat;
   polydextrose;
   and a karaya gum, the fat of said frozen confection consisting essentially of triglyceride fat.

6. The frozen confection according to claim 5 wherein the level of triglyceride fat is less than 1 wt. %.

7. The frozen confection according to claim 6 wherein the level of triglyceride fat is less than 0.5 wt. %.

8. The frozen confection according to claim 5 wherein at least one source of fat is cream.

9. A low fat frozen confection comprising:
   less than 5 wt. % triglyceride fat;
   polydextrose; and
   said triglyceride having been added as cream, the fat of said frozen confection consisting essentially of triglyceride fat.

10. The frozen confection according to claim 9 wherein the level of triglyceride fat is less than 1 wt. %.

11. The frozen confection according to claim 9 wherein the level of triglyceride fat is less than 0.5 wt. %.

12. A low fat frozen confection comprising:
    less than 5 wt. % triglyceride fat;
    from 1 to 7 wt. % polydextrose;
    and tricalcium phosphate in an amount sufficient to provide from 10 to 30 % RDI of calcium, the fat of said frozen confection consisting essentially of triglyceride fat.

13. A low fat frozen confection comprising:
    less than 5 wt. % triglyceride fat;
    from 1 to 7 wt. % polydextrose; and from 0.02–0.5 wt. % of a karaya gum, the fat of said frozen confection consisting essentially of triglyceride fat.

* * * * *